US008423237B2

(12) United States Patent
Higgins

(10) Patent No.: US 8,423,237 B2
(45) Date of Patent: Apr. 16, 2013

(54) CONFIGURABLE FUNCTIONS FOR VEHICLE PARAMETERS

(75) Inventor: Paul Higgins, Abbotsford (CA)

(73) Assignee: Webtech Wireless Inc., Burnaby, British Columbia (CA)

( * ) Notice: Subject to any disclaimer, the term of this patent is extended or adjusted under 35 U.S.C. 154(b) by 314 days.

(21) Appl. No.: 12/813,353

(22) Filed: Jun. 10, 2010

(65) Prior Publication Data

US 2011/0307140 A1 Dec. 15, 2011

(51) Int. Cl.
*G06F 19/00* (2006.01)

(52) U.S. Cl.
USPC ........ 701/33.4; 701/29.1; 701/29.6; 701/32.7

(58) Field of Classification Search ................. 701/33.4, 701/29.1, 29.6, 32.7, 32.9
See application file for complete search history.

(56) References Cited

U.S. PATENT DOCUMENTS 6,084,870 A * 7/2000 Wooten et al. ................ 370/349
2001/0049579 A1* 12/2001 Fujino et al. .................. 701/114

* cited by examiner

*Primary Examiner* — James Trammell
*Assistant Examiner* — Jerrah Edwards
(74) *Attorney, Agent, or Firm* — John R. Flanagan

(57) ABSTRACT

The user configures to process at least two data sources without depending on preprogrammed functions or resorting to reprogramming the basic software of the device.

20 Claims, 1 Drawing Sheet

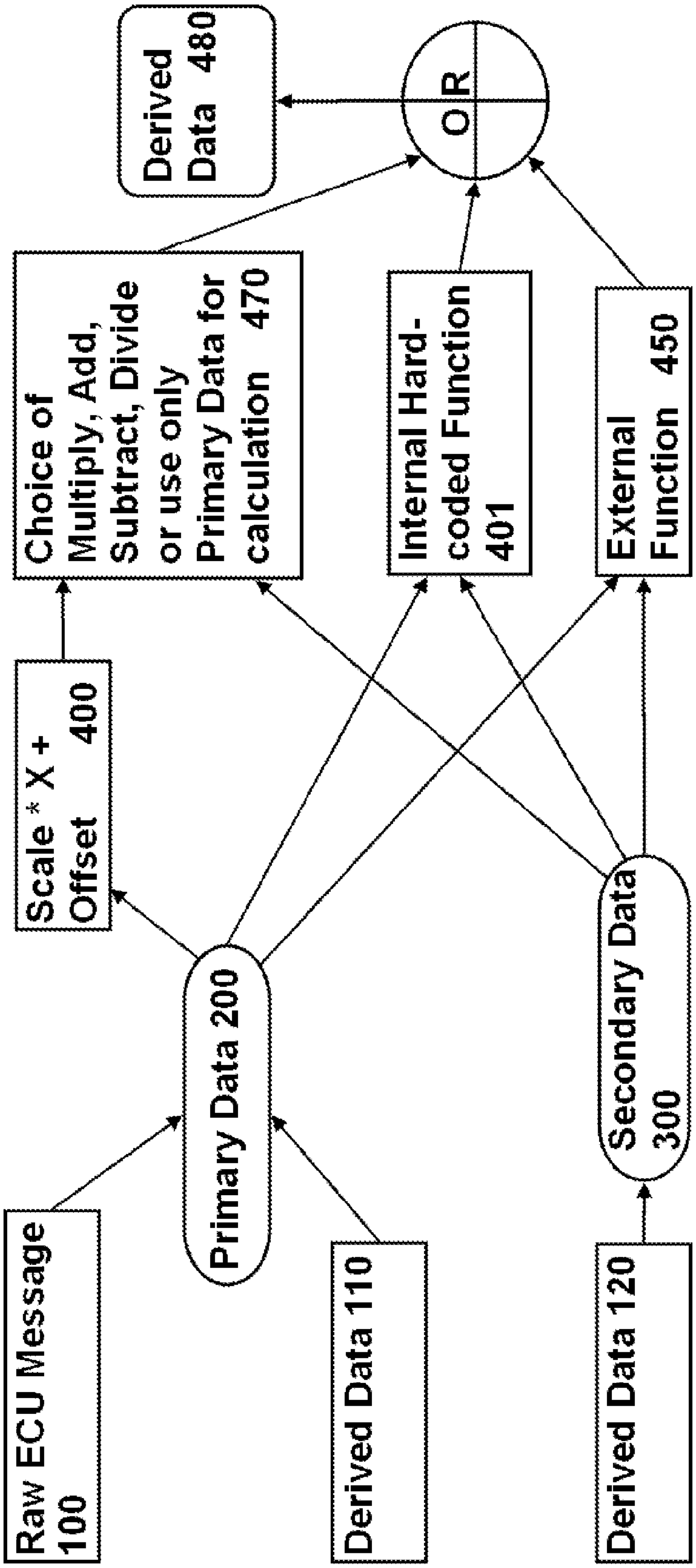
Raw ECU Message 100
Derived Data 110
Derived Data 120
Primary Data 200
Secondary Data 300
Scale * X + Offset 400
Choice of Multiply, Add, Subtract, Divide or use only Primary Data for calculation 470
Internal Hard-coded Function 401
External Function 450
OR
Derived Data 480

CONFIGURABLE FUNCTIONS FOR VEHICLE PARAMETERS

NOTICE REGARDING COPYRIGHTED MATERIAL

A portion of the disclosure of this patent document contains material which is subject to copyright protection. The copyright owner has no objection to the facsimile reproduction of the patent document or the patent disclosure as it appears in the Patent and Trademark Office file or records, but otherwise reserves all copyright rights whatsoever.

FIELD OF THE INVENTION

This invention relates to vehicle diagnostics.

BACKGROUND OF THE INVENTION

The current art of extracting raw data from a vehicle and converting it to engineering units is based on a one to one extraction of the data from the vehicle's bus messages and applying a linear scaling function. This conversion can be processed either in the diagnostic device or transmitted to a centralized host computer for conversion.

SUMMARY OF INVENTION

This invention extends the ability to process raw data to human understandable data values within a vehicle diagnostic computer to allow the user to create new data values from multiple raw data sources without depending on preprogrammed functions or resorting to reprogramming the basic software of the device.

Accordingly, the present invention is directed to a method of processing and communicating user defined vehicle diagnostic information. The method includes the computer implemented steps of: recognizing vehicle engine parameter identifiers (PIDs); receiving a mathematical function defined by a user without the user using a programming language; requesting a raw electronic engine control unit data string using a user selected PID; extracting from said data string one or more data points to result in primary data; and processing said primary data using said mathematical function; thereby resulting in derived data which can be communicated to the user through a vehicle diagnostic device.

The method of the present invention also includes the computer implemented steps of: recognizing vehicle engine parameter identifiers (PIDs); requesting a first raw electronic engine control unit data string using a first user selected PID; extracting from said first data string one or more data points to result in primary data; and processing said primary data using a mathematical function dependent upon a user preferred engineering unit of measure and a mathematical function from one of a user's choice of an internal hard coded function, a scaling factor and offset, and a user defined external function, thereby resulting in derived data which can be communicated to the user through a vehicle diagnostic device.

BRIEF DESCRIPTION OF THE DRAWINGS

A better understanding of the present invention can be obtained when the following detailed description of the preferred embodiment is considered in conjunction with the following drawings, in which:

FIG. 1 is a diagram that explains the combination of data sources and flow of data.

DETAILED DESCRIPTION

An engine (or electronic) control unit (ECU) determines the amount of fuel, ignition timing and other parameters of a vehicle engine by reading values from sensors monitoring the engine and other, associated vehicle components and (sub) systems (including those involving telematics). In particular, to use an exemplary standard, a vehicle can be determined by requesting a list of supported Parameter IDs (PIDs), as defined in OBDII/SAE J1979.

Conventional implementation of configuring for processing data allowed the user to extract the raw data from a specific location within a string of bits from a serially transmitted message from a vehicle's diagnostic message in raw or native format; and to 'scale' raw data to convert to desired engineering units by the linear formula of "mx+b" where 'm' and 'b' are configurable parameters. The result is that the raw data could be converted to the desired engineering units for any data point. This conversion, in particular, and many other functions, are conventionally provided by internal hard-coded firmware in the vehicle diagnostic device.

In contrast to conventional methods, a more flexible and user-convenient method is disclosed by the present invention. The present invention may be implemented in the vehicle telematics locator unit as a matter of convenience (so that, for example hardware and software resources may be shared with the telematics technology and so that the results of the present invention may be sent to a central intelligence, or may receive over-the-air commands from a central intelligence). For convenience, the present invention will be described as residing in the vehicle Locator but it will be appreciated that the present invention does not depend on the presence and absence of telematics technology, or on the exact physical location within the vehicle of the physical implementation of the present invention. The present invention can be implemented as a stand-alone unit interfacing with the ECU or equivalent sources of monitored PIDs.

With reference to FIG. 1, Raw ECU message 100 has data in its native (or near-native) form from the ECU. Derived Data 110 is raw ECU message that has already been processed so that relevant information is presented for easy reading. The user configures the Locator to chose which one of {Raw ECU message 100 and Derived Data 110} to use as Primary Data 200 (and if Raw ECU message 100 is chosen, it will be processed before forming part of Primary Data 200).

The user also configures the Locator to choose additional Derived Data 120 to form Secondary Data 300.

Thus two sources are defined, Primary Data 200 and Secondary Data 300.

The User configures the Locator to choose one of several methods to further process Primary Data 200. One conventional method is by an internal hard-coded function 401 which then produces Derived Data 480. Another conventional method is to process linearly Primary Data 200, i.e. multiply by a scaling factor or scalar and then add offset—step 400. A new method is by External Function 450 (which will be explained later below) which then produces Derived Data 480.

The User may configure that, in Step 470, the result of Step 400 (multiply by a scaling factor and then add offset) is processed in conjunction with Secondary Data 300, and the result of Step 470 becomes Derived Data 480. In Step 470, the interaction between Secondary Data 300 and the result of Step 400, is defined by the user choice of a common arithmetic operator (as will be explained below).

FIG. 1 shows the configurable mathematical options:

DerivedData 480=(Scaling*[Location within message of Raw Data]+Offset)<*or+or–or/or 0*>SecondaryData 300)

OR (External Function 450 using scripting Language (Primary Data,Secondary Data)

OR (Internal hardcoded Function 401(Primary Data, Secondary Data).

An exemplary format of a user-configurable command to define a conventional PID, is:

[<serviceName>define<description><PID><byteloc>:<bitloc><length><m_scaling factor><b_offset><unitsLabel>]

The invention allows additional parameters to be included in the command that, for example, transforms a single variable linear equation to a multivariable equation to create a new valued PID based on multiple variables operating (perhaps operating on each other) to transform the output variable to a new entity.

Each definition command of the present invention's new configuration command, allows two more fields: 1) an arithmetic operator field that will hold a value representing one of {multiplication, addition, subtraction or division}; and 2) an operand being a secondary data source, being a pre-defined PID. Accordingly, according to the present invention, the format of a user-configurable command to define a Derived PID is:

[<serviceName>define<description><PID><byteloc>:<bitloc><length><m_scaling factor><b_offset><unitsLabel><operator><operand>]

In its most basic form, the format of a user-configurable command to define a Derived PID is:

[<serviceName>define<description><primary data source><operator><operand=secondary source of data>]

where <operator> is any function recognized by mathematics and (however) implemented by mathematics and <operand=secondary source of data> is any other PID (whether pre-existing according to industry standards or another user-defined Derived PID).

Below is an example to calculate Fuel Economy in Litres/100 Kms where the available PIDs are MAF (mass air flow) and Speed in km/hr.

The equation for Fuel Economy=FuelRate {litres/hr}/Speed {km/hr}*100→{litres/100 km}

FuelRate is calculated as follows.

FuelRate=MAF*(3600{secs/hr})/(1000{cc/litres}*AirFuelRatio*gasoline density)

An example of the command for defining Speed (according to the above command format) as an exemplary Secondary Data 300) is:

[<J1979>define<speed><1-D><3:1><8><1><0><km/hr>]

Thus PID 1-D holds the value for speed.

Next is the command to use this secondary source in the formula to transform MAF and Speed into Fuel Economy (where scaling m=0.356=3600/1000*13.7*0.737{density: kg/L}:

[<J1979 define<fuelEconomy><99-85><3:1><8><0.356><0><L/100 kms></><1-D>]

Thus (user-defined) Derived PID 99-85 holds the value for Fuel Economy. This PID can be read by another (user-configured PID, created by the same method described herein) or sent upstream to central intelligence.

The operator in the above example is "/" (division) and the Secondary Data 300 is PID 1-D which has been calculated above. In other words, user-defined Derived PID 99-85 transforms MFA and Speed into Fuel Economy by arithmetically processing Primary 200 and Secondary Data 300.

The benefits of the present invention include: the ability to create arbitrary functions; simplification of the built-in functions and their selection, so that, for example, fuel economy could be expected to be available but to supply conversions for all the methods of displaying fuel economy, the system would otherwise have to be preprogrammed for miles/gallon, km/litre or litre/100 kms; and if these two PIDs are not available, fuel economy may have to be calculated from completely different sources (such as the dwell time of the injector pulses that have very different transforming equations).

External Function.

The concept of the external function feature is to provide a method for the PID processing code to determine if a PID is connected to an externally processed computation, and then provide the interface hooks to send the captured data to that external code and then to retrieve the results for further processing and/or storage.

The following pseudo code shows how the external function is initiated. The external function can be expressed using any standard or custom programming language that can be executed within the telematics computing device.

```
While( PidRecord = getNextPid( ) ) != endofPidList)
{
if( externalFunctionName = CheckForExternalFunction( ) !=
NULL)
{
PrimaryData = PidRecord.getValue( );
SecondaryData = PidRecord.getSecondaryValue( );
newPrimaryData = ExternalFunctionHandoff(
externalFunctionName, PrimaryData, SecondaryData);
PidRecord.setValue( newPrimaryData );
}
//...continue processing by checking for internal configuration
}
```

The 'CheckForExternalFunction' function simply parses the definitions of the PIDs and determines if it has been configured to interact with an external function (relative to the program that is asking). The specific expression used to apply the external function, is to insert a "flag" or similar marker (when parsing)—for example, a "@" character as the first character in the <description> field of the user-configured Derived PID definition record. The remaining characters are the alphanumeric name that identifies the external function in the external programming application, and control is thereby passed accordingly.

The 'External Function Handoff' function is an interface routine that passes the name of the function and any number of internally obtained data values to the another program running in the computer. This other program will then return the value after having executed any arbitrary sequence of computer code crafted by a programmer.

Herein, the term "primary" and "secondary" are used only in the numerical counting sense (of "first" and "second") and without necessarily connoting any sense of the relative "importance" of the respective data they enumerate.

It will be appreciated that one of Primary Data 200 or Secondary Data 300 is or could be itself a PID that is the result of a prior application of the present invention (i.e. is Derived Data 110 or Derived Data 120).

It will be appreciated that the result may be treated as a PID that other PID-defining functions can read and use, or may be simply forwarded to central intelligence for further processing.

It will be appreciated by those skilled in the art that this invention can be continued with a "tertiary" (or third) data (i.e. the resulting PID is the result of processing three pieces of data).

Thus, it is seen that user creates the equation for derived data points rather than limited to a selection of prior programmed functions.

The significance of this invention is that it allows the user to create a custom algorithm from a simple set of operations without having to resort to programming languages. It allows the user to remain as a domain expert without requiring him to be a programming expert.

Allow more than two input data points in each configurable function. This will reduce the intermediate data point requirements and be easier to create more complex functions Instead of having the user configure the functions through configuration commands, the user may use external scripting languages to process the input data points to obtain the derived data point value.

It will be appreciated that arithmetic operators other than the conventional {addition, subtraction, multiplication, division) are possible and advisable depending on the application (e.g. pick the largest of the absolute value of processed Primary Data 200 and Secondary Data 300). Thus, for example, the configurable operator could be more complex mathematical functions such as Square Root functions, Power Functions, Logarithmic functions, and complex Table lookup functions, fuzzy logic tables, whether such functions are accessed directly or indirectly on the operand.

Accordingly, depending on the nature of the operator (arithmetic or more complex), the nature of the operand will be defined in alignment (semantically and physically to model the realities of the engine and associated vehicle components).

Provide Scaling Functionality (conversion to engineering units) for the secondary data point so that two raw data points could be used in the same configured function.

Although the method and apparatus of the present invention has been described in connection with the preferred embodiment, it is not intended to be limited to the specific form set forth herein, but on the contrary, it is intended to cover such alternatives, modifications, and equivalents, as can be reasonably included within the spirit and scope of the invention as defined by the appended claims. All figures are drawn for ease of explanation of the basic teachings of the present invention only; the extensions of the figures with respect to number, position, relationship, and dimensions of the parts to form the preferred embodiment will be explained or will be within the skill of the art after the following teachings of the present invention have been read and understood. Further, the exact dimensions and dimensional proportions to conform to specific force, weight, strength, and similar requirements will likewise be within the skill of the art after the following teachings of the present invention have been read and understood.

The invention claimed is:

1. A method of processing and communicating user defined vehicle diagnostic information, said method comprising the computer implemented steps of:

recognizing vehicle engine parameter identifiers (PIDs);

requesting a first raw electronic engine control unit data string using a first user selected PID;

extracting from said first data string one or more data points to result in primary data; and processing, by a processor, said primary data using a mathematical function dependent upon a user preferred engineering unit of measure and a mathematical function from one of a user's choice of: an internal hard coded function; a scaling factor and offset; and a user defined external function;

thereby resulting in user defined derived data which can be communicated to the user through a vehicle diagnostic device.

2. The method of claim 1, wherein said PIDs are selected from a choice of manufacturer defined PIDs or user defined PIDs.

3. The method of claim 1, wherein extracted said one or more data points are processed, stored and later retrieved to result in said primary data.

4. The method of claim 1, wherein secondary data is selected by a user for inclusion in said user chosen mathematical function.

5. The method of claim 4, wherein said secondary data is derived from either a user selected second PID or a user configured PID and is processed depending on a user preferred engineering unit of measure before being further processed with said primary data using said user chosen mathematical function.

6. The method of claim 4, wherein any of:

said user defined derived data;

said primary data, after processing; and said secondary data, after processing;

is stored within said vehicle diagnostic device and identified by a user defined PID.

7. The method of claim 1, wherein said internal hard coded function and said external function are mathematical functions.

8. The method of claim 1, wherein said user defined external function is configured without requiring the user to use a computer programming language.

9. The method of claim 1, wherein said vehicle diagnostic device is a stand alone unit located within the vehicle.

10. The method of claim 1, wherein said vehicle diagnostic device is located within or in communication with a vehicle's telematics locator unit.

11. The method of claim 1, wherein said vehicle diagnostic device is configured for receiving data including any defined external functions from a central intelligence device, the data being communicated between said vehicle diagnostic device and said central intelligence device being communicated wirelessly and/or through wired connection.

12. The method of claim 1, wherein said vehicle diagnostic device is configured for sending data to a central intelligence device, the data being communicated between said diagnostic device and said central intelligence device being communicated wirelessly and/or through wired connection.

13. A user configurable vehicle diagnostic device comprising:

a computer having computer executable instructions, said computer coupled to a vehicle's electronic control unit;

an input for inputting commands to said computer; and an output for communicating user defined derived data relating to the vehicle;

wherein said diagnostic device is configured for:

recognizing vehicle engine parameter identifiers (PIDs);

requesting a first raw electronic engine control unit data string using a first user selected PID;

extracting from said first data string one or more data points to result in primary data; and processing said primary data using a mathematical function dependent upon a user preferred engineering unit of measure and a mathematical function from one of a user's inputted choice of: an internal hard coded function; a scaling factor and offset; and a user defined external function;

thereby resulting in user defined derived data that is communicated to a vehicle operator and/or a remote central intelligence.

14. The diagnostic device of claim 13, wherein said PIDs are selected from a choice of manufacturer defined PIDs or user defined PIDs.

15. The diagnostic device of claim 13, wherein extracted said one or more data points are processed, stored and later retrieved to result in said primary data.

16. The diagnostic device of claim 13, wherein secondary data is selected by a user for inclusion in said user chosen mathematical function.

17. The diagnostic device of claim 16, wherein said secondary data is derived from either a user selected second PID or a user configured PID, and is processed depending on a user preferred engineering unit of measure before being further processed with said primary data using said user chosen mathematical function.

18. The diagnostic device of claim 13, wherein user may define the external function without requiring the user to use a computer programming language.

19. The diagnostic device of claim 13, wherein said diagnostic device is located within or in communication with a vehicle's telematics locator unit.

20. A method of processing and communicating user defined vehicle diagnostic information, said method comprising the hardware implemented steps of:

recognizing vehicle engine parameter identifiers (PIDs);

receiving a mathematical function defined by a user without requiring the user to use a computer programming language;

requesting a raw electronic engine control unit data string using a user selected PID;

extracting from said data string one or more data points to result in primary data; and processing, by a processor, said primary data using said mathematical function dependent upon a user preferred engineering unit of measure and a mathematical function from one of a user's inputted choice of: an internal hard coded function; a scaling factor and offset; and a user defined external function;

thereby resulting in user defined derived data which can be communicated to the user through a vehicle diagnostic device.

* * * * *